(12) United States Patent
Chen

(10) Patent No.: US 8,850,074 B2
(45) Date of Patent: Sep. 30, 2014

(54) DATA SYNCHRONIZATION METHOD

(75) Inventor: Li Jen Chen, Taipei (TW)

(73) Assignee: Dimerco Express (Taiwan) Corporation, Taipei (TW)

( * ) Notice: Subject to any disclaimer, the term of this patent is extended or adjusted under 35 U.S.C. 154(b) by 235 days.

(21) Appl. No.: 13/351,985

(22) Filed: Jan. 17, 2012

(65) Prior Publication Data

US 2013/0042023 A1    Feb. 14, 2013

(30) Foreign Application Priority Data

Aug. 8, 2011    (TW) .............................. 100128261 A

(51) Int. Cl.
  *G06F 15/16*        (2006.01)
  *G06F 9/54*         (2006.01)
(52) U.S. Cl.
  CPC ....................................... *G06F 9/54* (2013.01)
  USPC ..................................................... 709/248
(58) Field of Classification Search
  USPC ................................................. 709/203, 248
  See application file for complete search history.

(56) References Cited

U.S. PATENT DOCUMENTS

| | | | |
|---|---|---|---|
| 7,032,033 B1 * | 4/2006 | Ledoux et al. ................ | 709/248 |
| 7,715,444 B2 * | 5/2010 | Goyal et al. .................. | 370/507 |
| 8,060,662 B2 * | 11/2011 | Aihara ............................ | 710/8 |
| 8,255,571 B2 * | 8/2012 | Sharp et al. ................... | 709/248 |
| 2008/0167066 A1 * | 7/2008 | Yoon et al. ................. | 455/550.1 |
| 2008/0189419 A1 * | 8/2008 | Girle et al. .................... | 709/227 |
| 2009/0077263 A1 * | 3/2009 | Koganti et al. ............... | 709/248 |
| 2009/0282096 A1 * | 11/2009 | Kamrowski et al. .......... | 709/203 |
| 2012/0233346 A1 * | 9/2012 | Sang ............................. | 709/231 |

* cited by examiner

*Primary Examiner* — Joshua Joo
(74) *Attorney, Agent, or Firm* — Muncy, Geissler, Olds & Lowe, P.C.

(57) ABSTRACT

The present invention provides a data synchronization method applied to a host and at least a client. First, the host transmits a request for synchronization operation to the client. The client replies at least a piece of connection information to the host. The host judges if the connection information contains operation flags. If not, the host transmits a request for data transmission to the client for driving the client to transmit the corresponding data of the connection information to the host. When the host completes receiving the data, the host stores an operation flag to the connection information and transmits it to the client for overwriting the connection information in the client.

6 Claims, 7 Drawing Sheets

DATA SYNCHRONIZATION METHOD

FIELD OF THE INVENTION

The present invention relates generally to a data processing system and method, and particularly to a data synchronization method.

BACKGROUND OF THE INVENTION

Enterprise management is gradually transforming from artificial independent management to systematic centralized management. Management is changed according to the respective market environments confronted by enterprises, and hence making the management schemes of enterprises transform from conventional artificial management to using management systems for executive planning, commodity deployment, and manpower deployment and planning in enterprises in order to facilitate keeping competitive advantages in constantly changing markets. In addition, the sales networks of enterprises can be strictly monitored and controlled for maintaining fluent sales channels as well as improving management level inside and outside enterprises. Regarding to data inside enterprises, for example, commodity or human-resource deployment data, under the framework of multiple departments, each department of enterprises needs to set up its own data independently. Meanwhile, the data needs to be shared among departments. Thereby, data synchronization is required inside enterprises, such as using an enterprise resource planning (ERP) system, for avoiding duplicate allocation of internal resources in the same project or planned operation.

With the development trend of globalization in economics, lots of cross-regional and transnational enterprise groups emerge. The subsidiary organizations of the enterprise groups are distributed in the world and they need shared information for joint operations. Accordingly, management and control of their data in enterprise resource sharing has become an important constituent of operations for such enterprises. Thanks to the development of information technologies, cross-organizational and cross-regional data access and coordination have become possible. Management of data synchronization is being stressed increasingly. No matter distributed or centralized management, the host needs to be connected with a plurality of clients. In particular, for enterprises having numerous sales points, their clients need to establish more clients. In such a scenario, special attention should be paid to data synchronization for avoiding abnormality in data synchronization systems, which may lead to data damages.

Currently, in order to enhance the efficiency of data access as well as to reduce the loss caused by malfunctions, enterprises generally adopt distributed data management systems. For data synchronization, in addition to preventing repeated customer data and allocating duplicate enterprise resources on the same customer, one should be even more cautious on the problems of data loss and redundant data. The problem of data loss usually happens during the transmission process. For example, when an abnormal condition occurs during the process of data synchronization, such as interrupt of network transmission, the whole process of data synchronization will fail. Due the huge amount of transmitted data during general data synchronization, data abnormality caused by network interrupt is difficult to rescue. It is necessary to re-read the complete data from the client to the synchronization host, which will lead to severe impact on the stability of the overall system operations.

A general data synchronization system can only extract data from critical fields for simplifying the amount of the data transmitted during the process of data synchronization as well as the amount of data storage in the synchronization host. Nonetheless, after long-term usage, customer data need to be updated. Alternatively, in the short term, customer data need to be modified repeatedly. Thereby, the data synchronization system will make the synchronization host to duplicate all the data in the client according the synchronization principles and thus making the synchronization host access many redundant data. The redundant data will accumulate day by day, and hence burdening the synchronization host.

Accordingly, the present invention provides a data synchronization method, which improves the problems of data loss as well as redundant data in a data synchronization system according to the prior art. Thereby, the efficiency of data synchronization can be enhanced.

SUMMARY

An objective of the present invention is to provide a data synchronization method, which can improve the problem of data loss.

Another objective of the present invention is to provide a data synchronization method, which can improve the problem of redundant data.

The present invention provides a data synchronization method, which is applied to a host and at least a client. First, transmit a request for synchronization operation from the host to the client. The client transmits at least a piece of connection information to the host according to the request for synchronization operation for the host to judge if the received connection information contains operation flags. Then transmit a request for data transmission to the client according to the connection information not containing operation flags. Next, the client transmits the corresponding data of the connection information to the host. When the host completes receiving the corresponding data of the connection information, store an operation flag to the connection information and transmits the connection information to the client for overwriting the connection information in the client.

Besides, the present invention further uses a status flag to record the update status of data. In addition to judging the operation flag, the host further judges the status flag for performing synchronization operations on the updated data between the host and the client. Thereby, duplication of redundant data in the host can be avoided, and hence solving the problem of redundant data.

DETAILED DESCRIPTION

In order to make the structure and characteristics as well as the effectiveness of the present invention to be further understood and recognized, the detailed description of the present invention is provided as follows along with embodiments and accompanying figures.

Figure 1A:
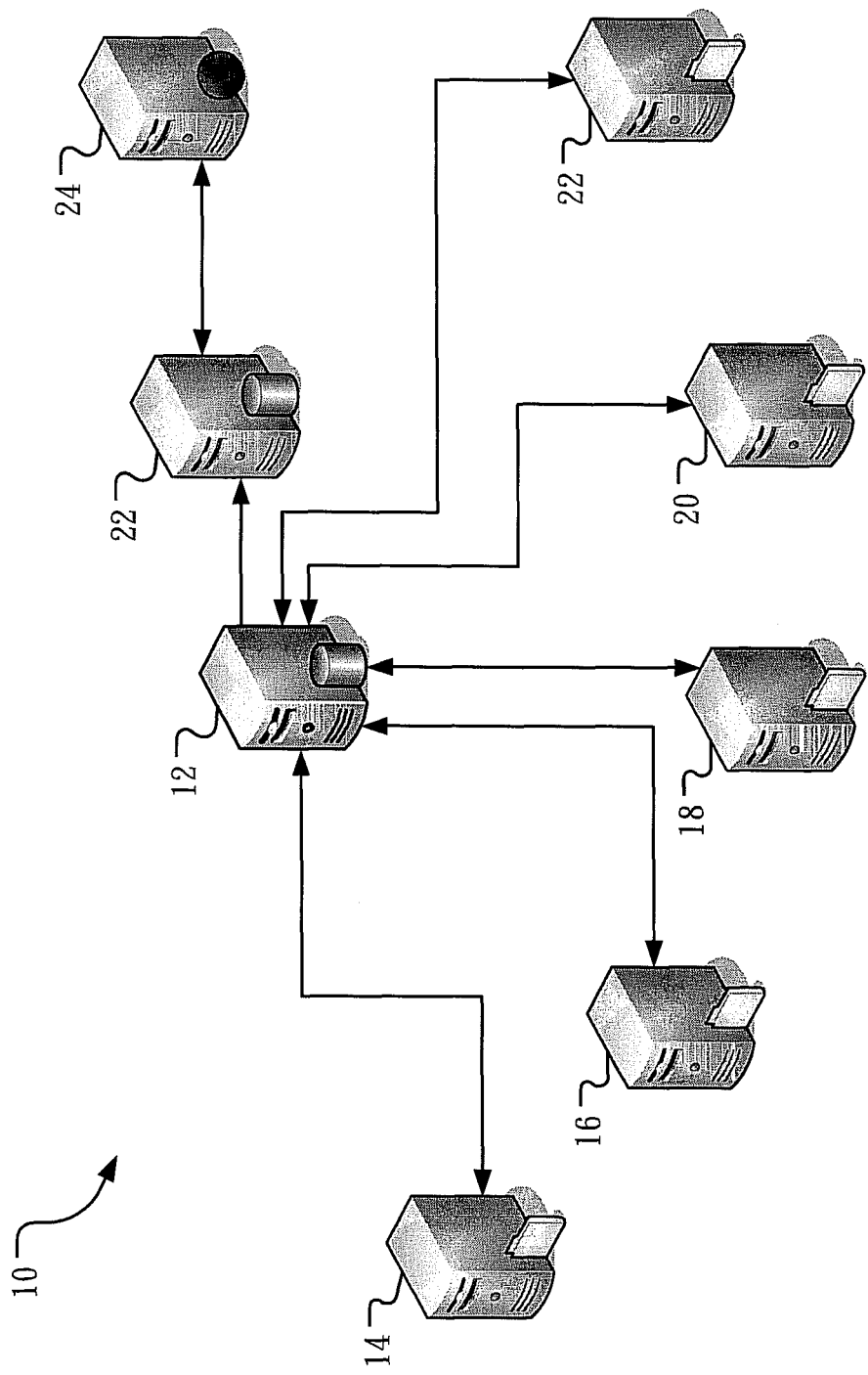
FIG. 1A shows a block diagram of the host and the clients according to an embodiment of the present invention.
Figure 1B:
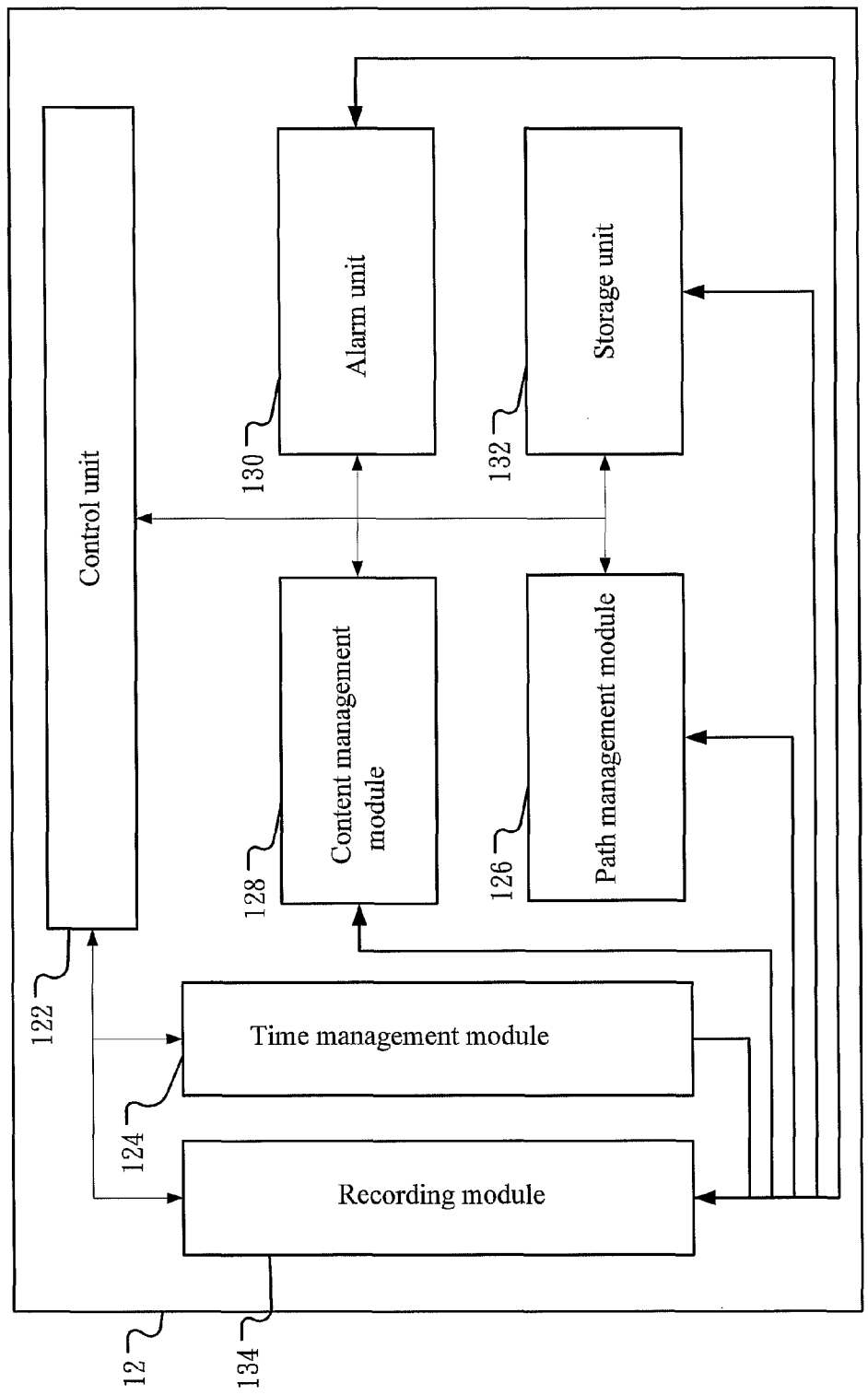
FIG. 1B shows a block diagram of the architecture of the host according to an embodiment of the present invention.

FIGS. 1A and 1B show block diagrams of the host and the clients and the architecture of the host according to an embodiment of the present invention. As shown in the figures, the data synchronization system 10 according to the present invention comprises a host 12 and at least a client 14. According to the present embodiment, a plurality of clients are used for example. Thereby, the clients further comprise a client 16, a client 18, a client 20, and a client 22. The host 12 comprises a control unit 122, a time management module 124, a path management module 126, a content management module 128, an alarm unit 130, a storage unit 132, and a recording module 134. According to the present embodiment, the host 12 further comprises a backup host 22 and a control interface 24.

As shown in FIG. 1A, the clients 14, 16, 18, 20, 22 according to the present embodiment are connected to the host 12 by a wired network. Besides, the backup host 22 is connected to the host 12 and the control interface 24 and is used for backing up all data in the host 12, including the related data for synchronization operations and the executed data during the operation of the host 12. In addition, the backup host 22 provides connection for the control interface 24 according to the data it has backed up. Thereby, the backup host 22 is connected to the external network via the control interface 24. Nevertheless, the host 12 and the clients 14, 16, 18, 20, 22 are not connected to the control interface 24.

As shown in FIG. 1B, the control unit 122 is connected with the time management module 124, the path management module 126, the content management module 128, the alarm unit 130, and the storage unit 132. The recording module 134 is connected to the control unit 122, the time management module 124, the path management module 126, the content management module 128, the alarm unit 130, and the storage unit 132, respectively. In addition, the backup host 22 is connected to the host 12 and the control interface 245, respectively.

The plurality of clients 14, 16, 18, 20, 22 store at least a datum, respectively. According to the present embodiment, the data stored in the plurality of clients 14, 16, 18, 20, 22 are different. In other words, the plurality of clients 14, 16, 18, 20, 22 are located in different regions, so that the data stored therein are not the same. However, the present invention is not limited to the embodiment. The plurality of clients 14, 16, 18, 20, 22 can further store data having the same attributes but located in different regions. The host 12 inquires in turn the operation flags of the stored data in the clients 14, 16, 18, 20, 22 and hence copying the data accordingly.

The host 12 controls the time management module 124, the path management module 126, the content management module 128, the alarm unit 130, and the storage unit 132 by means of the control unit 122. The time management module 124 has a time management datum. After a delay time for a complete turn of inquiry, according to the time management datum of the time management module 124, the host 12 connects to and transmits requests for synchronization operation to the plurality of clients 14, 16, 18, 20, 22 according to the path management module 125. Thereby, the clients 14, 16, 18, 20, 22 can reply the connection information to the host 12, which can judge if the connection information contains operation flags for confirming whether synchronization operations needs to be performed. Consequently, long-term connection between the host 12 and the plurality of clients 14, 16, 18, 20, 22, which occupies a substantial network bandwidth, can be avoided.

The host 12 manages the connection of the host 12 via the path management module 126 and controls connection to the plurality of clients 14, 16, 18, 20, 22. That is to say, the path management module 126 has a connection datum. The host 12 connects to at least one of the plurality of clients 14, 16, 18, 20, 22 according to the connection datum. The host 12 uses the control unit 122 to read the connection datum of the path management module 126 for acquiring the connection addresses, such as the IP addresses or the web addresses, of the plurality of clients 14, 16, 18, 20, 22. The content management module 128 has an extraction rule for managing the content of the data extracted by the host 12. For example, the host 12 is defined to extract the customer name, phone number, address, and the current operating status from the customer data only. The alarm unit 130 transmits an alarm message to the corresponding client according to an invalid synchronization operation between the host and the plurality of clients 14, 16, 18, 20, 22. For example, the host 12 has not completed receiving the data from the plurality of clients 14, 16, 18, 20, 22. The storage unit 132 stores the data extracted from the clients 14, 16, 18, 20, 22 by the host 12. The recording module 134 records the control unit 122, the time management module 124, the path management module 126, the content management module 128, the alarm unit 130, the storage unit 132, and the recording module 134 of the host 12 for recording all operations of the host 12.

The host 12 according to the present embodiment judges if to receive the data from the client according to whether the corresponding connection information of the client contains operation flags. If not, the host 12 transmits a request for data transmission to the client, which will reply the data corresponding to the connection information to the host 12. Besides, when the host 12 completes receiving the data of the client, the host 12 will store the operation flag to the connection information for the host 12 to judge completion of the synchronization operation. Meanwhile, the connection information after the storing operation will be transmitted to the client for overwriting the connection information in the client. If the host 12 has not completed receiving the data of the client, the host 12 will not store the operation flag to the corresponding connection information. Thereby, the host 12 can judge that the operation has not completed; the host 12 will continue to transmit requests for data transmission to the client according to the connection information not containing operation flags, so that the client will transmit the data corresponding to the connection information to the host 12. Consequently, the host 12 will continue to complete receiving the data, set the operation flag to the connection information, transmit the connection information to the client, and overwrite the connection information in the client.

Figure 2A:
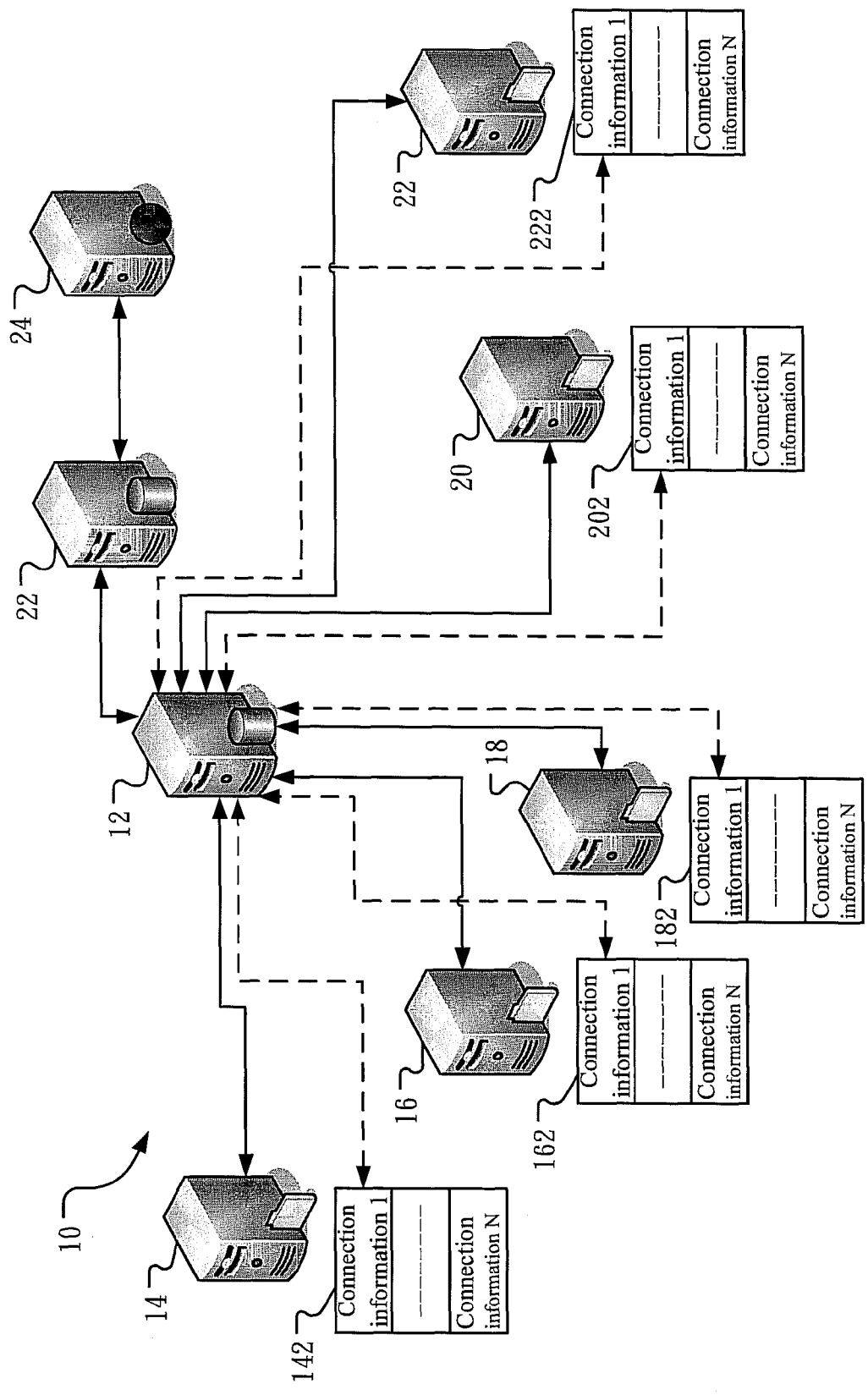
FIG. 2A shows a block diagram of data connection between the host and the clients according to an embodiment of the present invention.
Figure 2B:
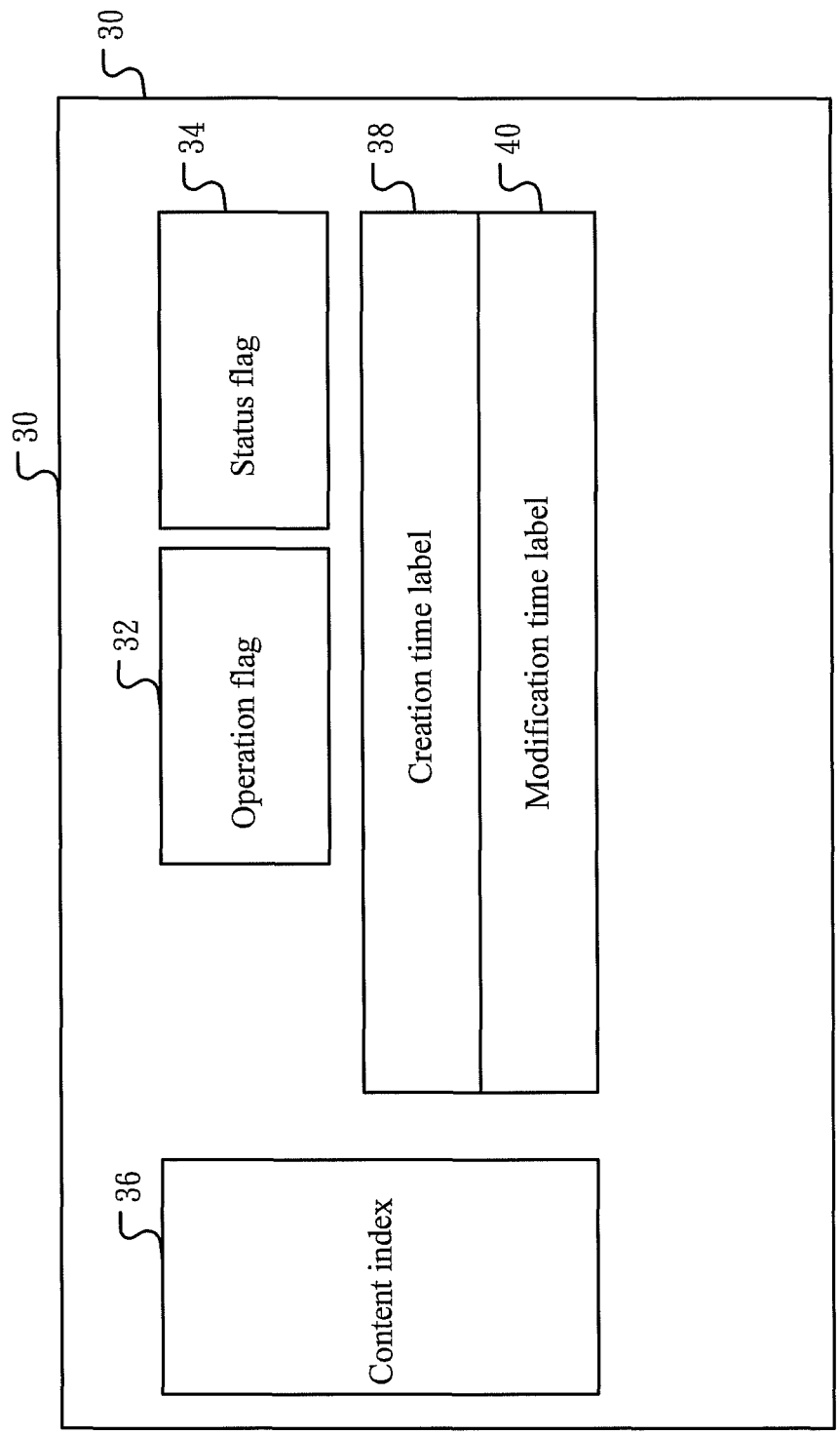
FIG. 2B shows a block diagram of the architecture of connection information according to an embodiment of the present invention.

FIGS. 2A and 2B show block diagrams of data connection between the host and the clients and of the architecture of connection information according to an embodiment of the present invention. As shown in the figure, the data synchronization system 10 is the same as the device shown in FIG. 1A. The difference between FIG. 1A and FIG. 2A is that FIG. 2A further labels the connection information 142, 162, 182, 202, 222 of each of the clients 14, 16, 18, 20, 22. The architecture of connection information 30 according to the present embodiment is the architecture of connection information accessed by the clients 14, 16, 18, 20, 22. The architecture of connection information 30 comprises an operation flag 32, a status flag 34, a content index 36, a creation time label 38, and a modification time label 40.

The architecture of connection information 30 labels completion of synchronization operation according to existence of the operation flag 32. Namely, the host 12 (as shown in FIG. 2A) judges if the synchronization operation for the corresponding data in the client is completed according to whether the architecture of connection information 30 contains the operation flag 32. The connection information containing the operation flag 32 represents completion of synchronization operation for the corresponding data. Thereby, the host 12 will ignore the connection information. On the other hand, the connection formation not containing the operation flag 32 represents incompletion of synchronization operation for the corresponding data. The host 12 transmit a request for data transmission to the corresponding client according to the architecture of connection information 30 not containing the operation flag 32 for receiving and storing the corresponding data in the client.

When the network is abnormal and interrupts the synchronization operation between the client and the host 12, the host 12 will not store the operation flag 32 to the architecture of connection information 30. Thereby, the host 12 can know that the corresponding data has not completed synchronization operation because the architecture of connection information 30 does not contain the operation flag 32. The host 12 will continue to re-execute the synchronization operation. In other words, the host 12 will transmit a request for data transmission to the corresponding client again for receiving and storing data from the client anew.

The status flag 34 labels the update status of data and corresponds to the modification time label 40. That is, once the data of the clients 14, 16, 18, 20, 22 is modified, the clients 14, 16, 18, 20, 22 will label only the status flag 34 of the architecture of connection information 30 in the connection information 142, 162, 182, 202, 222 of the last updated data thereof as the newest data. For example, for a 1-bit status flag, "0" represents the old data, while "1" represents the newest data. Thereby, the host 12 needs to perform synchronization operation for the newest data only. It is not necessary to perform synchronization operation for the old data under modification or the derivative data produced during modification. Consequently, the host 12 can simplify the amount of data required for synchronization operation by means of the status flag 34 in the architecture of connection information 30.

The content index 36 is at least an initial address of the content contained in data. Namely, the context index 36 is the physical address used for storing the data corresponding to the architecture of connection information 30 in the client 14, 16, 18, 20, 22. For example, a data storage device uses the hexadecimal Fx000111F to represent the physical address of the stored data. Thereby, the content index 36 stores Fx000111F. The creation time label 38 stores the creation time of the architecture of connection information 30, which is the creation time when a user creates data in the client. The modification time label 40 stores the modification time of the architecture of connection information 30, which is the modification time when a user last modifies data in the client.

The present invention judges if the synchronization operation of data has completed according to whether the architecture of connection information 30 contains the operation flag 32, and hence avoiding interruption of the synchronization operation due to abnormality of network or circuits. After the host 12 is interrupted owing to abnormality, it can continue to execute the synchronization operation according to the architecture of connection information 30 not containing the operation flag 32. In addition, the host 12 further performs the synchronization operation for the data last modified according to the status flag 34 for simplifying the data amount required by the synchronization operation. Thereby, the host 12 will not receive the derivative data produced during the modification process of data or the old data. Consequently, occupation of the system resources of the host 12 by redundant data can be prevented.

Figure 3A:
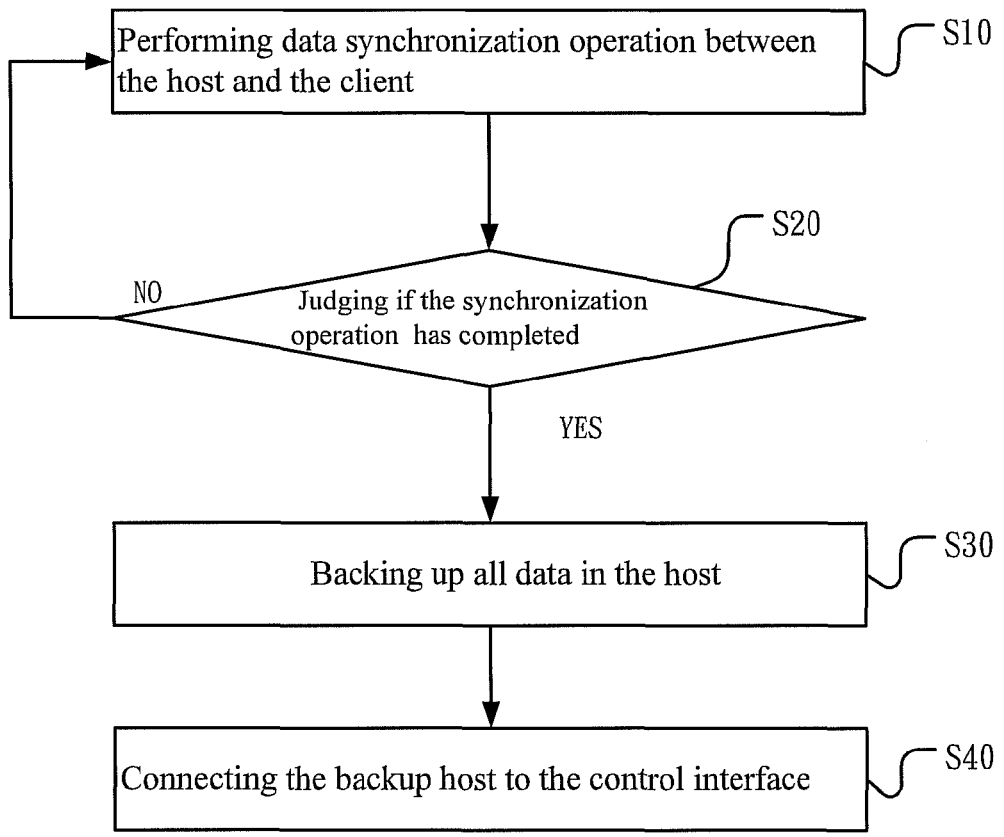
FIG. 3A shows a flowchart of the process of data operation according to an embodiment of the present invention.

FIG. 3A shows a flowchart of the process of data operation according to an embodiment of the present invention. As shown in the figure, the process of data operation according to the present invention is applied between a host and at least a client and to the data operation of the host connecting to the outside. The process of data operation comprises steps of:

Step S10: Performing data synchronization operation between the host and the client;

Step S20: Judging if the synchronization operation has completed;

Step S30: Backing up all data in the host; and

Step S40: Connecting to the backup host by using the control interface.

In the step S10, the data synchronization operation between the host and the client is performed according to the data synchronization method of the present invention for synchronizing the data stored in the host with the data accessed by the client. In the step S20, the host judges if the synchronization operation with the client has completed. When the host judges the synchronization operation of the last data has completed, the step S30 is continued. Otherwise, the step S10 is followed. In the step S30, the backup host backing up all the data accessed during the synchronization operation of the host. In the step S40, the control interface is connected to the backup host for providing the backup data in the backup host as well as providing data inquiry.

Figure 3B:
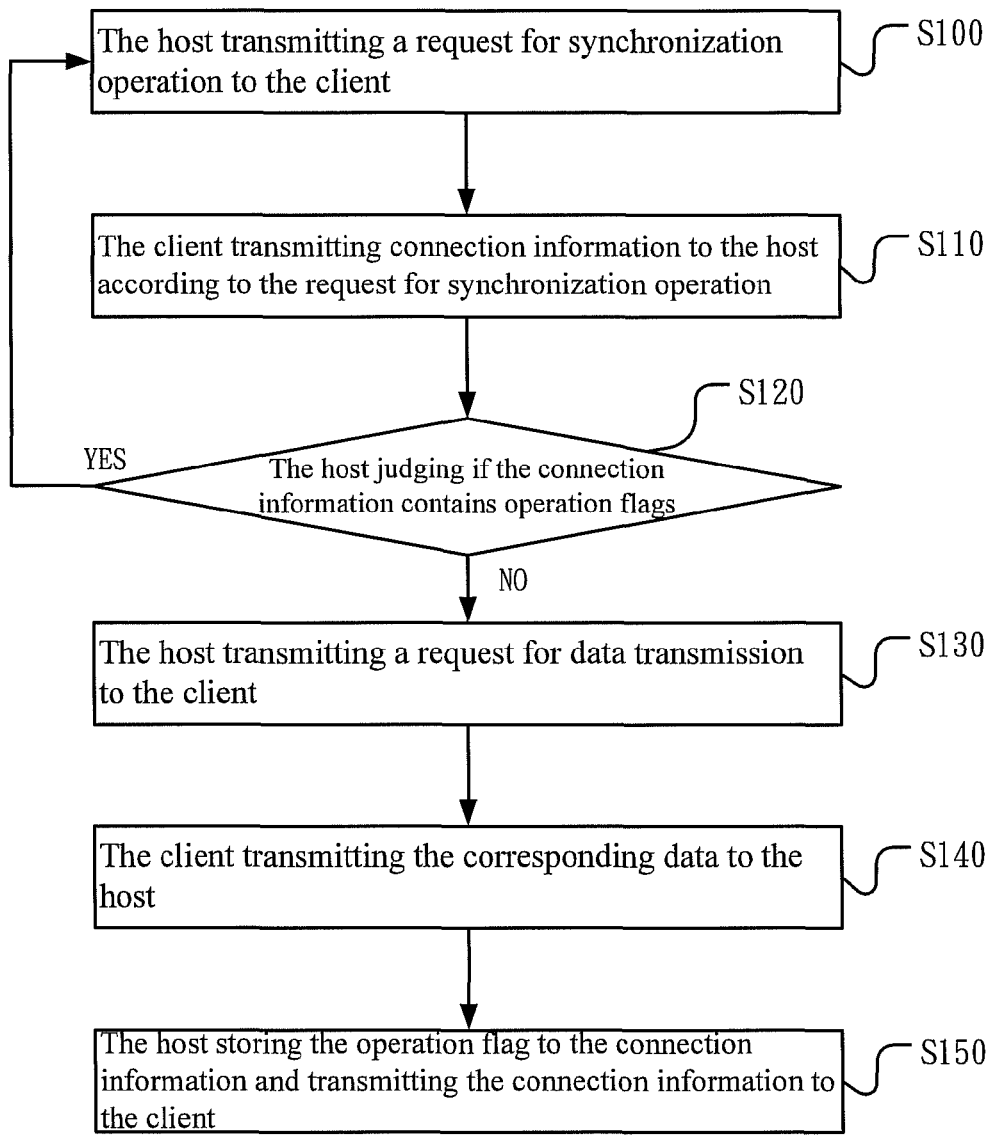
FIG. 3B shows a flowchart of the data synchronization method according to an embodiment of he present invention.

FIG. 3B shows a flowchart of the data synchronization method according to an embodiment of he present invention. As shown in the figure, the data synchronization method according to the present invention is used for synchronization the data accessed by the host with the data stored in the client. The method according to the present invention comprises steps of:

Step S100: The host transmitting a request for synchronization operation to the client;

Step S110: The client transmitting connection information to the host according to the request for synchronization operation;

Step S120: The host judging if the connection information contains operation flags;

Step S130: The host transmitting a request for data transmission to the client;

Step S140: The client transmitting the corresponding data to the host; and

Step S150: The host storing the operation flag to the connection information and transmitting the connection information to the client.

In the step S100, the host transmits the request for synchronization operation to the client. The in the step S110, the client transmits the related connection information corresponding to the synchronization operation to the host. In the step S120, the host judges if the corresponding data of the connection information has completed the synchronization operation according to whether the operation flag exists in the connection information. If so, the step S100 is executed; if not, continue to execute the step S130. Meanwhile, the host will judge the update status according to the status flag for judging the most updated data in the client. In the step S130, the host transmits a request for data transmission to the client according to the connection information not containing the operation flag and the corresponding status flag. In the step S140, the client transmits the corresponding most updated data to the host according to the request for data transmission by the host for performing the synchronization operation. Namely, copy the most updated data in the client to the host. In the step S150, after the host has completed receiving the corresponding data of the connection information not containing the operation flag, store the operation flag to the connection information and transmit it to the client for overwriting the connection information in the client.

Figure 3C:
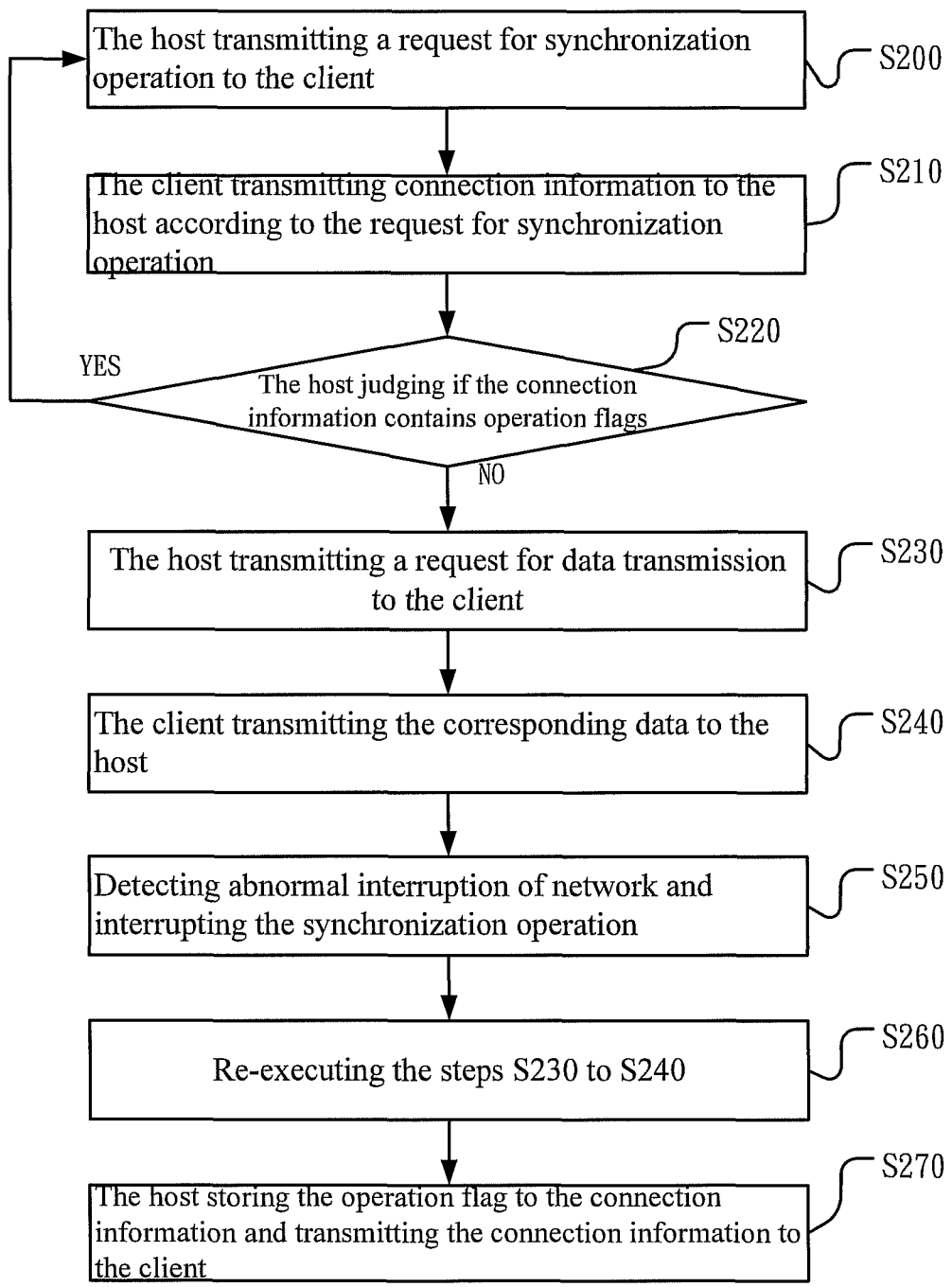
FIG. 3C shows a flowchart of the data synchronization method according to another embodiment of he present invention.

FIG. 3C shows a flowchart of the data synchronization method according to another embodiment of he present invention. The difference between FIG. 3B and FIG. 3C is that the latter further comprises a step, which is a step when the synchronization operation is abnormal. In other words, the present embodiment is used for handling the situation when data synchronization is abnormal and interrupted. As shown in the figure, the data synchronization method according to the present invention comprises steps of:

Step S200: The host transmitting a request for synchronization operation to the client;
Step S210: The client transmitting connection information to the host according to the request for synchronization operation;
Step S220: The host judging if the connection information contains operation flags;
Step S230: The host transmitting a request for data transmission to the client;
Step S240: The client transmitting the corresponding data to the host;
Step S250: Detecting abnormal interruption of network and interrupting the synchronization operation;
Step S260: Re-executing the steps S230 to S240; and
Step S270: The host storing the operation flag to the connection information and transmitting the connection information to the client.

In the step S200, the host transmits the request for synchronization operation to the client. The in the step S210, the client transmits the related connection information corresponding to the synchronization operation to the host. In the step S220, the host judges if the corresponding data of the connection information has completed the synchronization operation according to whether the operation flag exists in the connection information. If so, the step S200 is executed; if not, continue to execute the step S230. Meanwhile, the host will judge the update status according to the status flag for judging the most updated data in the client. In the step S230, the host transmits a request for data transmission to the client according to the connection information not containing the operation flag and the corresponding status flag. In the step S240, the client transmits the corresponding most updated data to the host according to the request for data transmission by the host for performing the synchronization operation. Namely, copy the most updated data in the client to the host.

In the step S250, the host detects interruption of the network connection between the host and the client. Thereby, the host interrupts the synchronization operation between the host and the client. In the step S260, after the network connection between the host and the client is recovered, the synchronization operation between the host and the client is executed anew. In other words, the steps S230 and S240 are re-executed and hence continuing to execute the synchronization operation before interruption. If incompletion occurs again, re-execute the step S260 again. In the step S270, after the host has completed receiving the corresponding data of the connection information not containing the operation flag, store the operation flag to the connection information and transmit it to the client for overwriting the connection information in the client.

The situation of interruption due to abnormality in the synchronization operation described in the step S250 above uses interruption of network connection as an example. Moreover, the abnormal interruption according to the present invention further includes the situation of interruption of the synchronization operation caused by abnormality in the host or in the client. The step described above can be used for preventing incurable scenarios caused by abnormal interruptions.

To sum up, the present invention provides a data synchronization method. The host judges during the synchronization operation if the corresponding connection information of the data stored in the client contains operation flags for judging whether the corresponding data has completed the synchronization operation. Then the host can receive the data not finishing the synchronization operation in the client. After the host has completed the synchronization operation, the operation flag is stored to the connection information for labeling completion of the synchronization operation. When the synchronization operation is abnormal and interrupted, the host will continue to finish the uncompleted synchronization operation for preventing incurable situation of the data in the synchronization operation when interruption between the host and the client due to abnormality occurs. Besides, the present invention further uses the status flag to label the most updated data for avoiding the host from performing synchronization operation for the modified data with the old data or the derivative data produced during data modification. Thereby, the data accessed by the host during synchronization operation can be simplified, and hence preventing the host from the problem of redundant data.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A data synchronization method, applied to a host and at least a client, and comprising steps of:
   said host transmitting a request for synchronization operation to said client;
   said client transmitting at least a piece of connection information to said host in response to the request;
   said host judging whether said connection information contains an operation flag for driving said client to transmit data to said host, said data corresponding to said connection information, wherein if said connection information does not contain said operation flag, said host transmits a request for said data to said client, and when said host completes receiving said data, said host stores an operation flag to said connection information and transmitting said connection information containing said operation flag to said client; and
   said client overwriting said connection information in the client with said connection information containing said operation flag received from said host.

2. The data synchronization method of claim 1, wherein when said host has not completed receiving said data corresponding to said connection information, stop writing said operation flag to said connection information, and said host continues to transmit said request for said data to said client for receiving said data corresponding to said connection information.

3. The data synchronization method of claim 1, wherein said connection information further includes a status flag, and said host further judges an update status of said data in said client according to said status flag.

4. The data synchronization method of claim 3, wherein said step of said host transmitting said request for said data to said client according to said connection information, said host further transmits said request for said data to said client according to said update status for driving said client to transmit said updated data to said host.

5. The data synchronization method of claim 1, wherein said connection information further comprises:
   a content index corresponding to at least an initial address of all contents of said data;
   a creation time label, storing a creation time of said data; and
   a modification time label, storing a modification time of said data.

6. The data synchronization method of claim 1, and further comprises steps of:
   backing up all synchronization data in said host to a backup host; and
   connecting to said backup host using a control interface and inquiring backup data in said backup host.

* * * * *